US006968366B1

(12) United States Patent
Zhang et al.

(10) Patent No.: US 6,968,366 B1
(45) Date of Patent: Nov. 22, 2005

(54) SYSTEM AND METHOD FOR MANAGEMENT, CREATION, STORAGE, SEARCH AND DELIVERY OF RICH MEDIA OPTIMIZED FOR E-COMMERCE IN A DISTRIBUTED INFORMATION NETWORK

(75) Inventors: Liang-Jie Zhang, White Plains, NY (US); Jai Menon, Croton-on-Hudson, NY (US); James S. Lipscomb, Yorktown Heights, NY (US); Keeranoor G. Kumar, Randolph, NJ (US); Shu-Chun Jeane Chen, Chappaqua, NY (US); Sih-Pin Subrina Chang, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,063

(22) Filed: May 12, 2000

(51) Int. Cl.[7] ............................................. G06F 15/16
(52) U.S. Cl. ...................... 709/219; 707/10; 707/104
(58) Field of Search ............................... 345/839, 619; 707/3, 4, 104, 10; 705/14; 709/217, 219

(56) References Cited

U.S. PATENT DOCUMENTS

| 5,241,671 | A | | 8/1993 | Reed et al. | |
|---|---|---|---|---|---|
| 5,414,644 | A | | 5/1995 | Seaman et al. | |
| 5,682,330 | A | | 10/1997 | Seaman et al. | |
| 5,742,816 | A | * | 4/1998 | Barr et al. | 707/3 |
| 5,761,655 | A | * | 6/1998 | Hoffman | 707/4 |
| 5,903,892 | A | | 5/1999 | Hoffert et al. | |
| 5,907,837 | A | * | 5/1999 | Ferrel et al. | 707/3 |
| 5,983,176 | A | | 11/1999 | Hoffert et al. | |
| 6,236,395 | B1 | * | 5/2001 | Sezan et al. | 345/723 |
| 6,243,713 | B1 | * | 6/2001 | Nelson et al. | 707/104.1 |
| 6,292,827 | B1 | * | 9/2001 | Raz | 709/217 |
| 6,335,746 | B1 | * | 1/2002 | Enokida et al. | 345/839 |
| 6,374,260 | B1 | * | 4/2002 | Hoffert et al. | 707/104.1 |
| 6,401,074 | B1 | * | 6/2002 | Sleeper | 705/14 |
| 6,549,922 | B1 | * | 4/2003 | Srivastava et al. | 707/205 |
| 6,593,936 | B1 | * | 7/2003 | Huang et al. | 345/619 |

* cited by examiner

*Primary Examiner*—Viet D. Vu
*Assistant Examiner*—Dustin Nguyen

(57) ABSTRACT

Techniques are provided for managing the creation, storage, search and delivery of rich media optimized for e-commerce in a distributed information network, e.g., the Internet. In an illustrative embodiment, a content creation phase generates rich media content in a single multimedia file in the format of a HotMedia file for delivery to a Rich Media Build Engine (RMBE). Rich media content is extracted from the file using pluggable and modular extractors providing an input to a commerce-based search engine and a full-text search engine. The outputs of the search engine are combined as a search result from which a searchable database directory is created. The output is stored in a conventional database, e.g., DB2. A web client is coupled to the search system through a web server providing a search query to the rich media database and receiving an output from the search engine.

22 Claims, 8 Drawing Sheets

Search and & Delivery of Rich Media

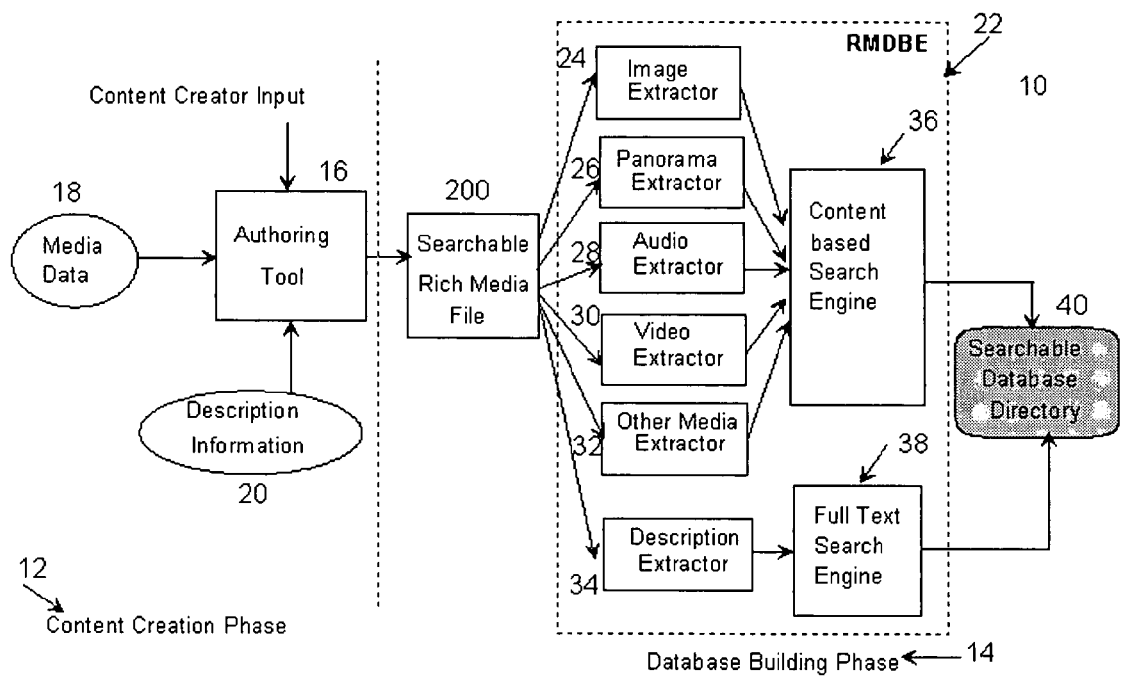
Figure 1. Create Searchable Rich Media Content & Database

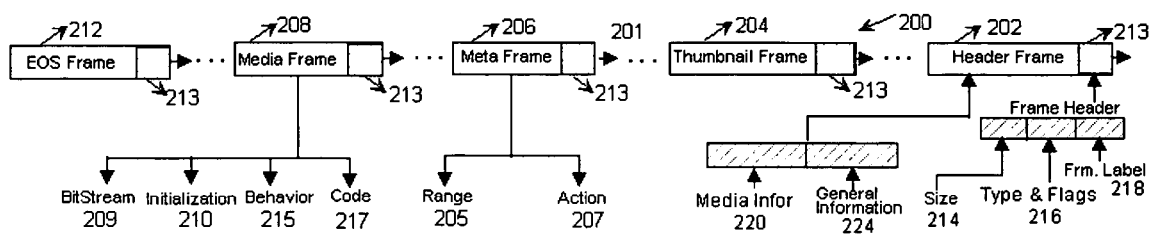
Figure 2. Representation of a HotMedia file format

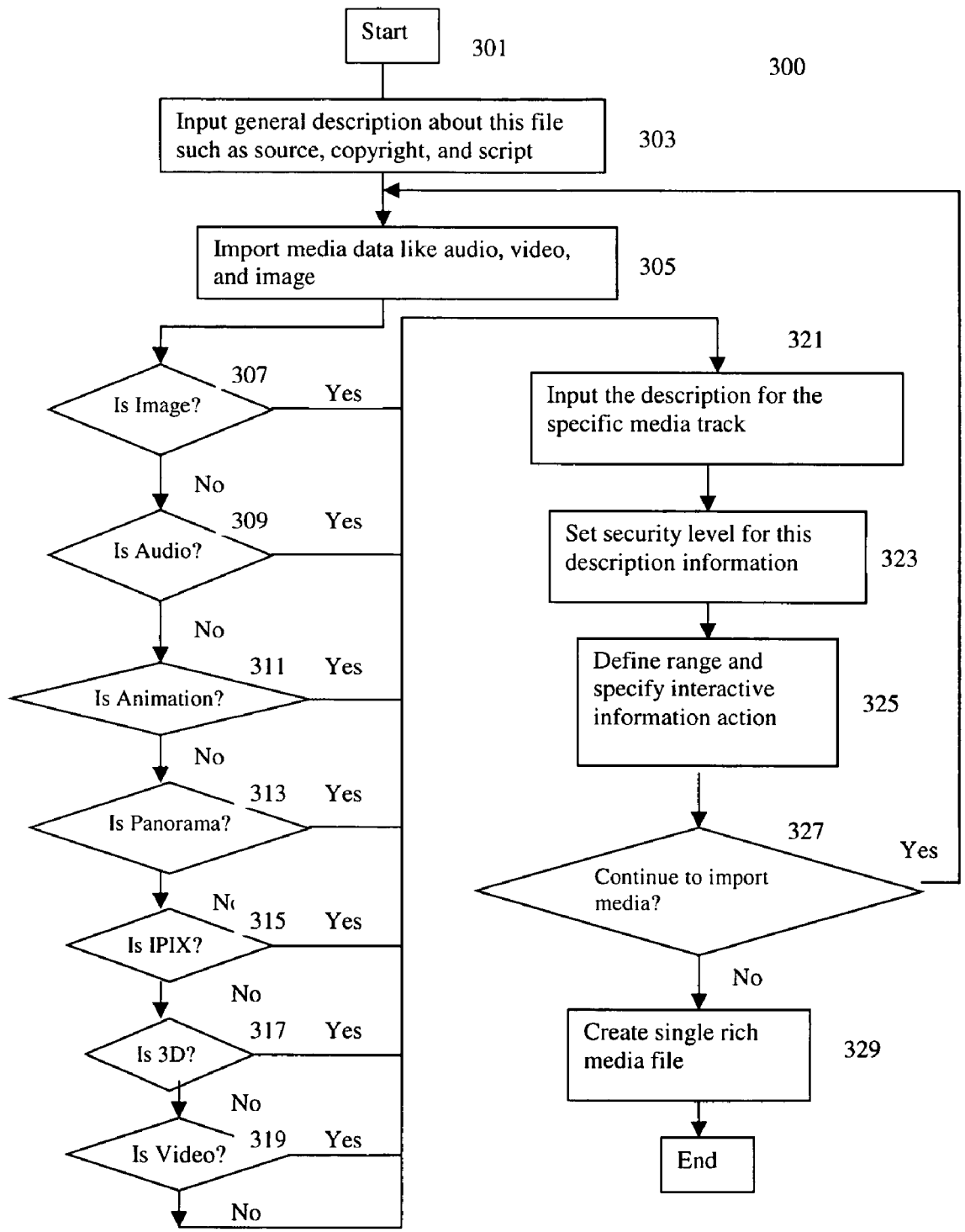
Figure 3. A flow diagram for searchable rich media content creation

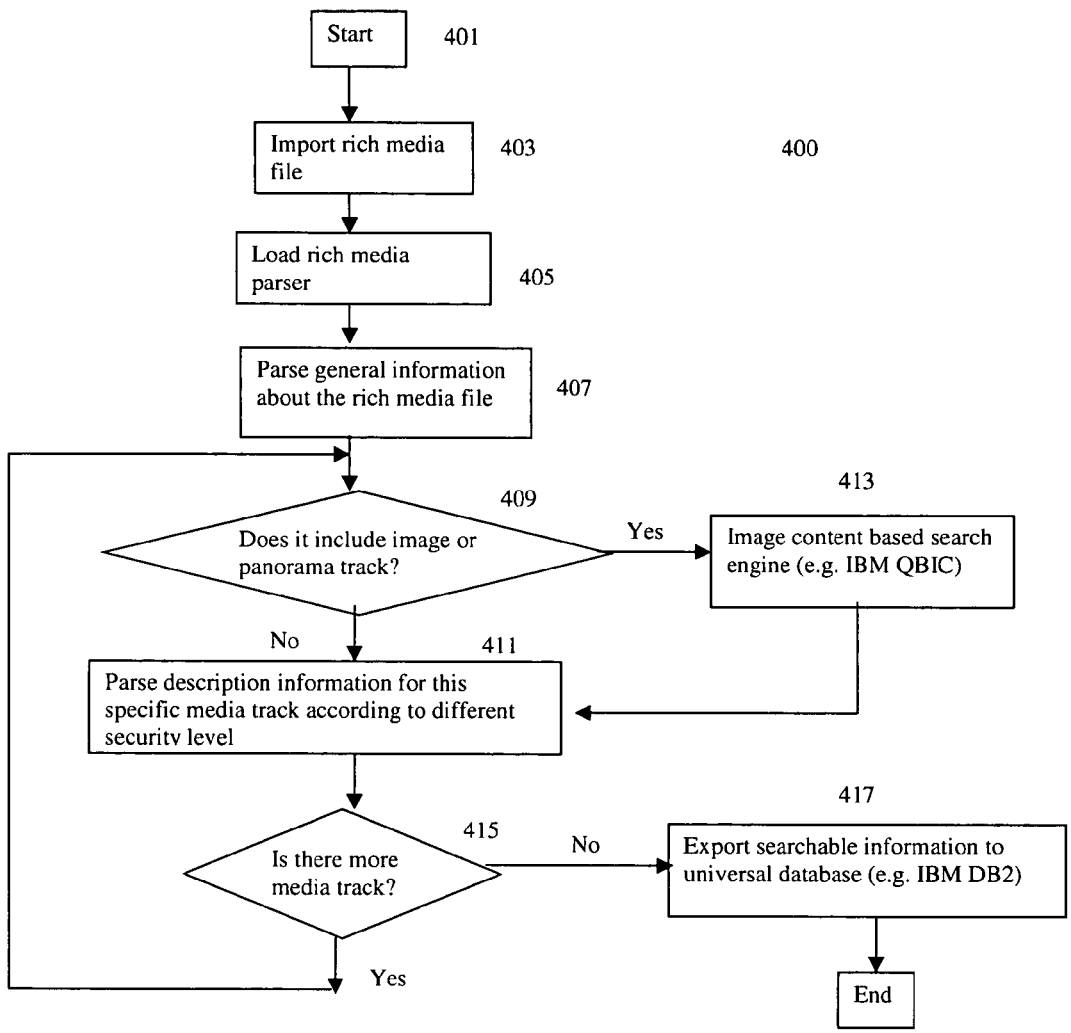
Figure 4. A flow diagram for building a searchable rich media database

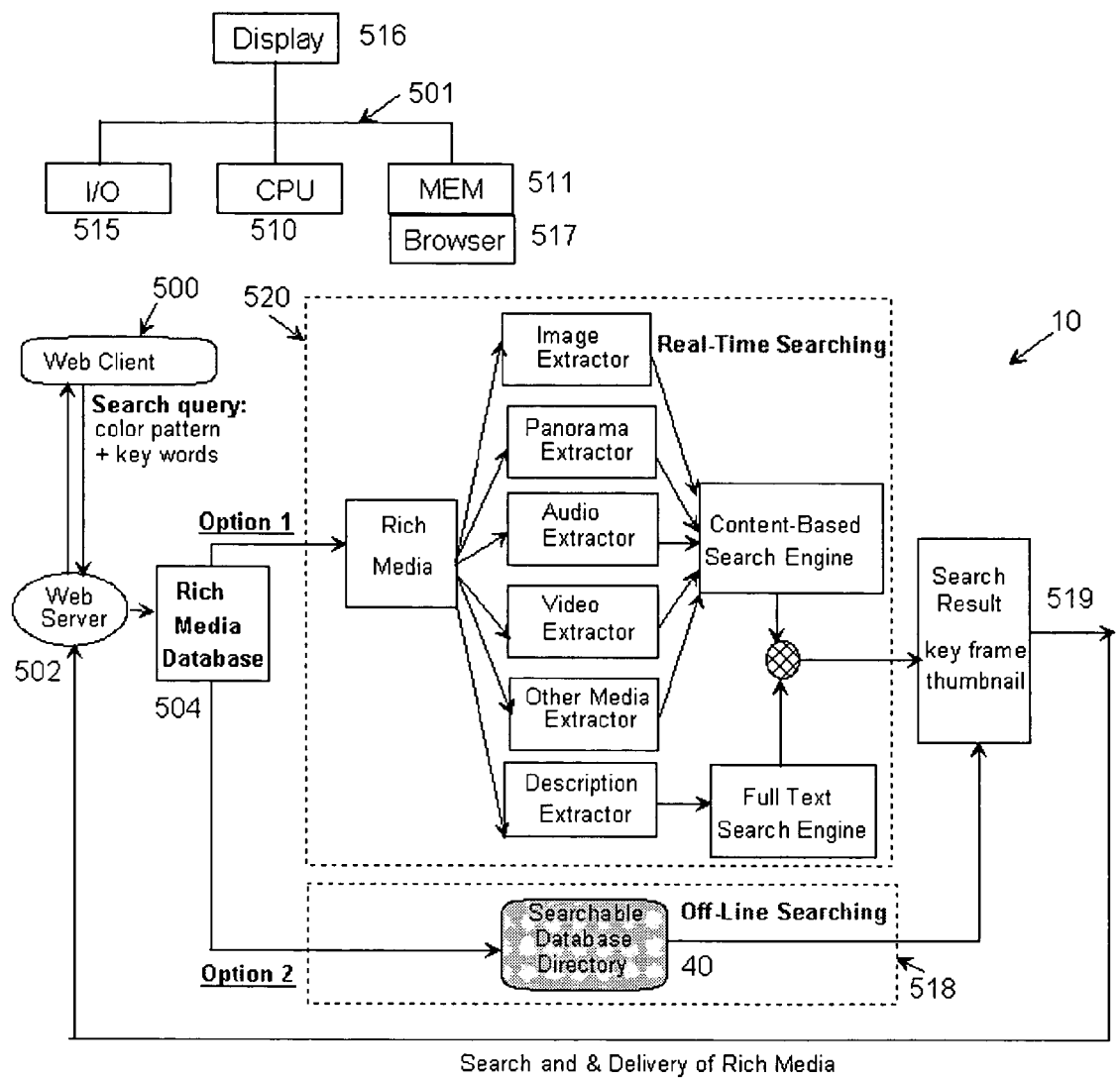
Figure 5. Search and Delivery of Rich Media

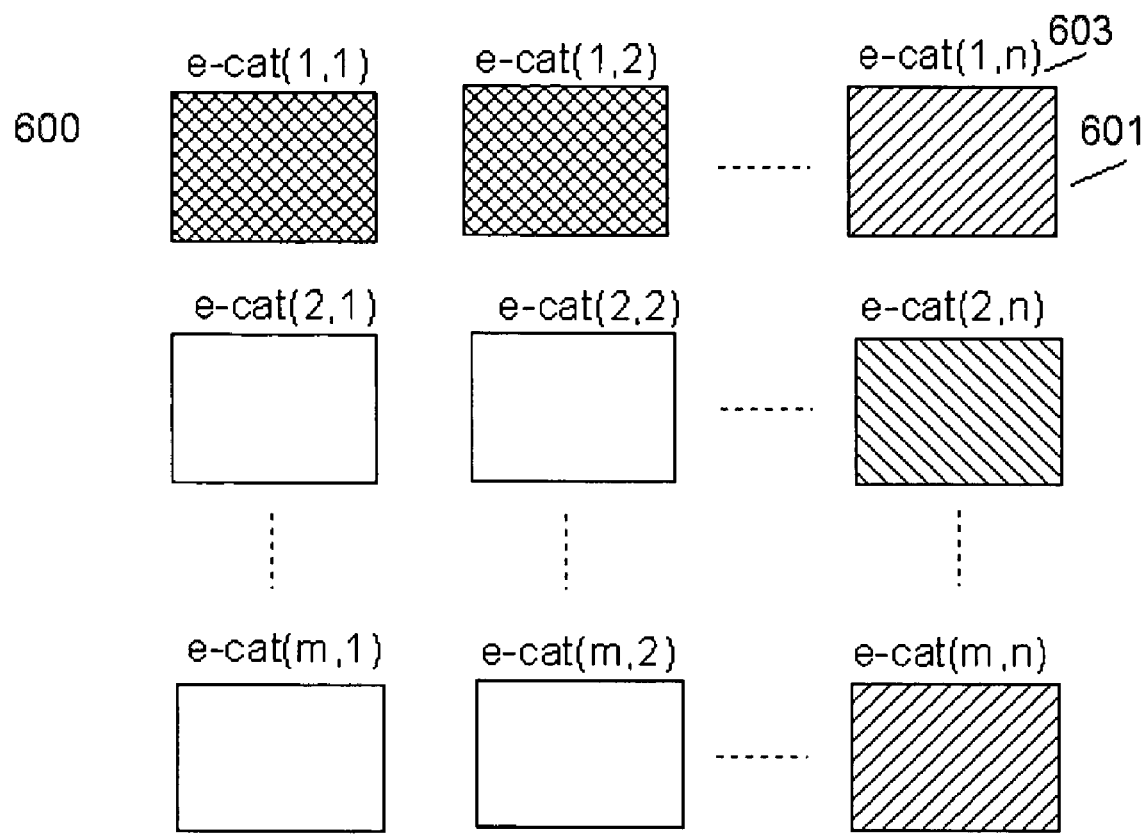
Figure 6. Multiple search results from rich media database

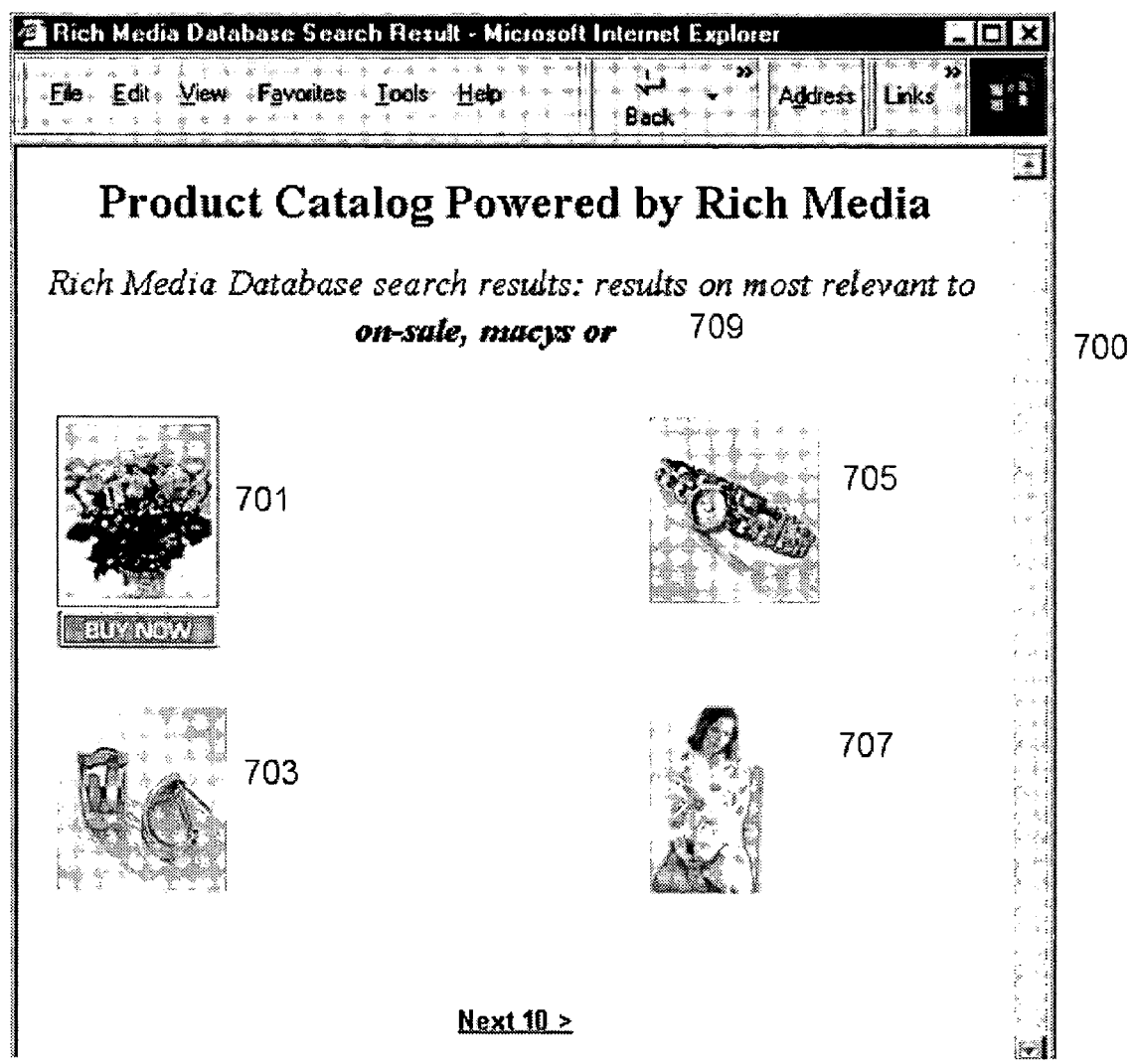
Figure 7. Example index page for search results

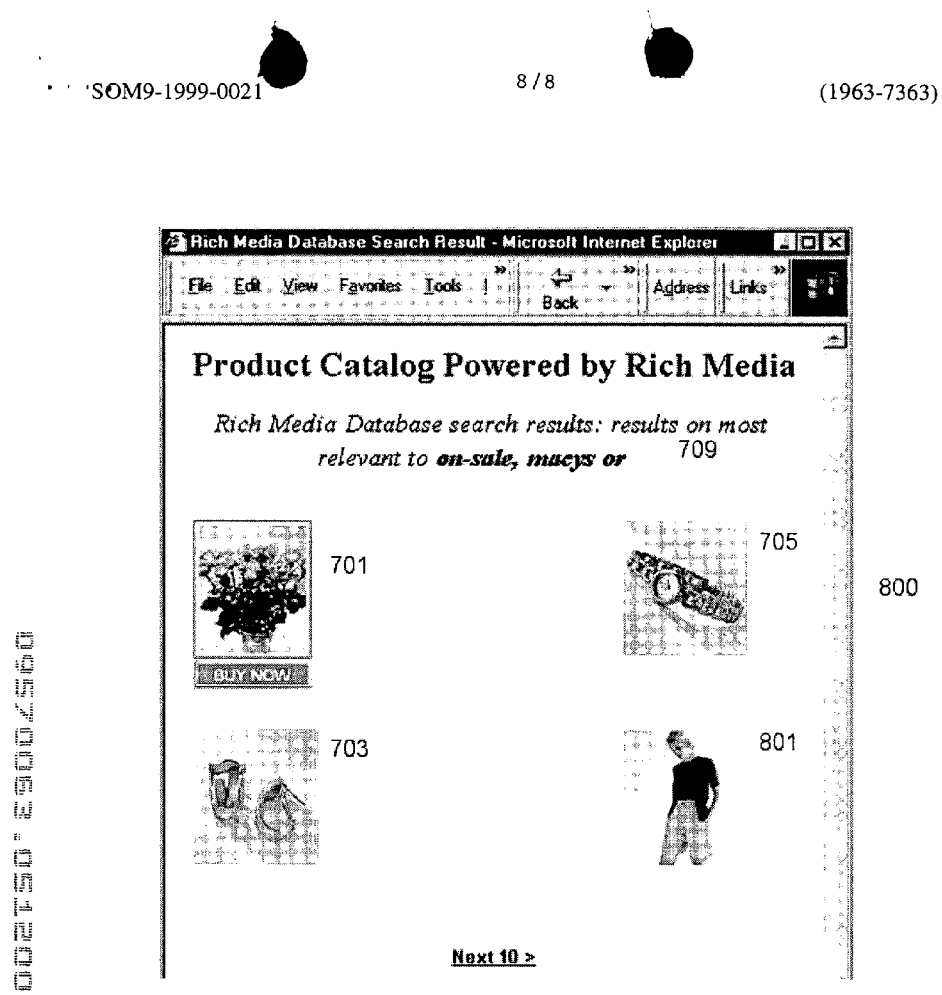
Figure 8. Example page of rich media on-demand

SYSTEM AND METHOD FOR MANAGEMENT, CREATION, STORAGE, SEARCH AND DELIVERY OF RICH MEDIA OPTIMIZED FOR E-COMMERCE IN A DISTRIBUTED INFORMATION NETWORK

BACKGROUND OF INVENTION

1. Field of Invention

This invention relates to multimedia, particularly rich media systems and methods of operation. More particularly, the invention relates to systems and methods for managing the creation, storage, search, and delivery of rich media optimized for e-commerce in a distributed information network, e.g., the Internet.

2. Description of Prior Art

Rich media is multimedia content that includes 2D or 3D animation, video and audio, fill-in forms, pull-down menus and typically allows for greater end-user interactivity. Through the higher degrees of interactivity, brand recall and direct response, rich media in on-line advertising is proving to significantly influence the end result and impact of campaigns. With rich media, online advertisers can create interactive banner ads or catalogs which more effectively steer consumers through the buying process using a variety of rich media effects including panoramas, animated GIFs, panning and scrolling images, multi-track animations, zoomable/multi-resolution images, audio and video presentations.

Rich media has found novel new applications. One such is the product description in e-commerce solutions. Let's think of the vivid applications that can be created with rich media technology in an e-commerce application. For example, in a fashion application, rich media will allow a sales representative or a customer to search for accessories that match the color of a garment; or in an on-line art catalog, rich media allows art teachers or historians to search for paintings that have a particular texture; or in a clip art service, rich media allows clients to select graphics for inclusion in documents based on a particular pattern, such as the vertical slats of a fence or the concentric arcs of a rainbow. That means, with the advent of content based search mechanisms, people tend to use a natural way to seek information such as visual features like color percentage, color layout, and textures occurring in the visual rich media contents.

More specifically, if a customer was interested in beautiful fashion clothes when visiting an on-line shopping mall, the customer would like to see the detail in rich-media powered advertisement. At that time, the customer would like to make queries of large rich media database based on visual pattern features and key words. But unfortunately, so far, this kind of technology has not been available. That is, the current search engines in the market cannot efficiently search the emerging rich media content-based database. The above-mentioned exciting shopping experiences are still in the future. What is needed is a system and method for managing the creation, storage, searching, and delivery of rich media optimized for e-commere in a distributed information network, e.g., the Internet. The following design goals are as follows:

1. A framework for making rich media searchable;
2. An authoring tool for creating searchable rich media content in an appropriate format;
3. A rich media database build engine for efficiently building rich media database;
4. A natural query method for searching rich media database; and
5. An efficient rich media delivery mechanism for efficiently displaying search result.

Prior art related to multimedia database systems include the following:

U.S. Pat. Nos. 5,903,892 and 5,983,176, issued May 11, 1999 and Nov. 9, 1999, respectively, disclose a method and apparatus for searching for multimedia files in a distributed database and for displaying results of the search based on the context and content of the multimedia files.

U.S. Pat. No. 5,241,671, issued Aug. 31, 1993, discloses a search system in which a multimedia database consists of text, picture, audio, and animated data through multiple graphical and textual entry paths. The database is searched through multiple graphical and textual entry paths. The entry paths include an idea search, a title finder search, a topic tree search, a picture explorer search, a history timeline search, a world atlas search, a researcher's assistant search, and a feature article search.

U.S. Pat. No. 5,414,644, issued May 9, 1993, and U.S. Pat. No. 5,682,330, issued Oct. 27, 1997, disclose a method of observing and comparing the visual and textual record of respective or related events recorded on a viewable media.

None of the prior art discloses a generalized system and method for managing the creation, storage, searching, and delivery of rich media optimized for e-commerce in a distributed information network, e.g., the Internet.

SUMMARY OF THE INVENTION

An object of the invention is a system and method for creating and building a searchable rich media data base for e-commerce applications in a distributed information network, e.g., the Internet.

Another object is a framework for authoring rich media content in a single multimedia file for storage and searching in a searchable rich media database.

Another object is a Rich Media Build Engine (RMBE) for constructing searchable contents units from a single multimedia file for a rich media database optimized for e-commerce applications in a distributed information network, e.g., the Internet.

Another object is a searchable rich media database constructed by an RMBE from a single file provided by an authoring tool.

Another object is an RMBE for extracting searchable contents units from a single multimedia file for a searchable rich media database using pluggable and modularized media and description extractors.

Another object is an RMBE providing content based search units and textual based search units from a single multimedia file.

Another object is a system and method for assembling a searchable rich media database from content units and textual units extracted from a single multimedia file.

These and other objects, features and advantages are achieved in a system and method for managing the creation, storage, searching, and delivery of rich media optimized for e-commerce in a distributed information network, e.g., the Internet. The system and method include (i) an authoring tool for creating rich media using media data and descriptive information in a single HotMedia file and (ii) a search and delivery system. The authoring tool is coupled to the search and delivery system through a Rich Media Building Engine (RMBE) used to extract searchable information from pluggable and modularized media extractors and a description extractor. The media extractors include an Image Extractor, Panorama Extractor, Audio Extractor, Video Extractor, and the like responsive to the output of the authoring tool. The output of each extractor is searchable content units. The rich media content is contained within the single HotMedia file which includes a thumbnail image representative of the file contents: media information (video, audio, animation, panorama, etc.) and synchronized information fields. A searchable database is constructed from the HotMedia file by a content-based search engine using inputs from the image extractor, panorama extractor, audio extractor, video extractor, and other media extractors as well as a full text search engine receiving inputs from the description extractor. In the HotMedia file, the JPEG or GIF-based images are stored in the original format. These images can be extracted by using a HotMedia parser. The thumbnail represents the first impression when the HotMedia file is loaded. Description information in the file is used to briefly introduce non-searchable content like audio, video, or non-linear images. In building the rich media database, all searchable content is extracted from the HotMedia file. Searchable content comprises visual images (e.g., thumbnail, images to form multitrack animations), description information. A searchable database directory is built by combining the results from the content-based search engine and the results from the full text search engine. Two options are available to search a query in the database. One uses an off-line search scheme based on a searchable database directory. Another option uses a real-time search scheme. The real-time search scheme is used only when there is no means to build a database directory off-line for search use. In operation, a web client provides a search query, for example, a color pattern plus key words to a web server linked to the rich media database through a real-time searching engine or an off-line search engine including a searchable database directory. In response to the a search engine, the rich media database will find images whose visual characteristics are closest to the examples in the search query using existing image search technologies like IBM QBIC and match keywords. The off-line search scheme deals with the thumbnail and description context. The real-time search scheme deals with the thumbnail, JPEG or GIF-based animation or video and description information. If there is no thumbnail, the description information will be shown first or a key image frame will be shown in an index page. Dynamic HTML (DHTML) is used to swap seamlessly to the HotMedia file upon user interest without leaving a current page. One of the DHTML implementations is to use IFRAME. A separate HTML page can be distributed into a series of IFRAMES. In each IFRAME, the HTML page will be designed to display the thumbnail first. A Java script function is set to dynamically load Java class files upon the user's mouse click. Then the Java script function will automatically replace the current thumbnail with rich media content without interrupting other thumbnails. No intrusion occurs to any other such search results. In a typical page, a thumbnail containing products or articles of interest is displayed in the page. Once the mouse is clicked on the thumbnail, the thumbnail will disappear. At the same time the HotMedia class files will be loaded and the corresponding rich media content will be played in the same place as the thumbnail. The advantage of rich media content is facilitated by building a new rich media database based on different database software. The original rich media files are copied to the new database and the RMBE is used to building a new rich media database with searchable capabilities.

BRIEF DESCRIPTION OF DRAWING

The invention will be further understood from the following detailed description of a preferred embodiment taken in conjunction with an appended drawing, in which:

FIG. 1 is a representation of a system incorporating the principles of the present invention and including an authoring tool and a Rich Media Build Engine (RMBE) for creating searchable rich media in a rich media database from a single multimedia file, typically a HotMedia file;

FIG. 2 is a representation of a single multimedia file in a HotMedia file format comprising a sequence of frames for transmitting rich media in the system of FIG. 1;

FIG. 3 is a flow diagram for creation of searchable rich media content from the single multimedia file in FIG. 2 using the system of FIG. 1;

FIG. 4 is a flow diagram for building a searchable rich media database using the system of FIG. 1;

FIG. 5 is a representation of the system of FIG. 1 in real-time or off-line searching and delivering rich media media content from searchable rich media content in response to a search query from a client;

FIG. 6 is a representation of multiple search results from the searchable rich media database of FIG. 3 in response to a client query;

FIG. 7 is an example of an index page for search results obtained in the system of FIG. 3 in response to a client query; and FIG. 8 is an example of an HTML page of rich media on-demand obtained in the system of FIG. 3 in response to a client query.

DESCRIPTION OF PREFERRED EMBODIMENT

FIG. 1 shows a system 10 for creating searchable rich media content and a searchable rich media database. The system 10 includes a content creation phase 12 and a database building phase 14. Included in the content creation phase is an authoring tool 16 receiving content creator input from a user. The content input is supplemented by media data 18 and description information 20. It is provided as single multi-media file, to be described hereinafter, to the database phase. The toolkit 16 may be located locally on a user's workstation or dispersed across a computer network. The content creation phase will enable the creator to specify the presentation events or user/client interactions that one can search during the presentation of rich media content.

In the database building phase 14, a Rich Media Building Engine (RMBE) 22 receives the single multi-media file from the content creation phase. The engine is a conventional processor programmed to process the file 200 and parse for information to be stored in a searchable database directory 40. The RMBE consists of a plurality of pluggable and modularized media extractors and description extractors. The media extractors include an image extractor 24, a panorama extractor 26, an audio extractor 28, a video extractor 30, other media extractors 32, and a description extractor 34. Details of potential extractors suitable for use in the invention are described in U.S. Pat. No. 5,903,892 and U.S. Pat. No. 5,983,176, incorporated herein by reference.

The image extractor will parse the rich media file first and extract all image frames. Images can be searched by several available content-based search engines including IBM's QBIC. The IBM QBIC system is described in "Query by Image and Video Content: The QBIC System," (Myron Flickner et al., IEEE Computer 28(9): 23–32, 1995) which is fully incorporated herein by reference.

The panorama track in HotMedia file can be parsed and searched in like manner using the IBM's QBIC. In the case of the audio extractor 28 and video extractor 30, an alternate to these extractors is description information related to these media tracks and using a full-text search engine to extract description information related to the audio extractor, video extractor and other media tractors. As a result, a content-based search engine 36 coupled to the media extractors and a full-text search engine 38 coupled to the description extractor 34, can build a searchable database directory 40 by combining the results from the content-based search engine and the results from the full-text search engine.

Having described the searchable rich media content creation phase and data building phase, it is believed appropriate to describe the single multi-media file 200 which, in one embodiment, may be in a HotMedia File Format. HotMedia File Formats are described in IBM Research Report RC21519 [97069] entitled "The HotMedia Architecture: Progressive and Interactive Media for the Internet," July 1999, which is fully incorporated herein by reference.

FIG. 2 shows a HotMedia presentation file 200 in a framework 201 which is essentially a sequence of frame types comprising header 202, thumbnail 204, meta 206, media 208, and an end of stream 212. The first frame is the header frame 202. The header is actually followed by the thumbnail frame 204. After these frames a sequence of other frames occurs in a no pre-mandated order or number. The header frame 202 is the only one whose presence is mandatory in the format. The most degenerate yet useful version would have a header frame followed by a thumbnail frame 204. Media frames 208 appear in all other instances. Meta frames 206 are present only in cases where non-default behavior and configuration are desired on cases where hyperlinked, action semantics are to be incorporated. The information for adaptive delivery option is stored in Meta frames 206. All frames have a 12-bit initial section 213 that enables a uniform protection for their identification to a type a frame label as well as determination of their size. The HotMedia File Format is created to have minimum overhead and maximum modularity. The format makes it suitable for optimal delivery over a low bandwidth as well as for rich experiences over a high bandwidth.

The header frame includes a frame header 213 which provides information about frame size 214, types of flags 216 and frame labels 218. The header frame 202 also includes media information 220 containing definition on different media tracks that may be contained in the ffile and searchable description information. General information 224 in the header frame 202 provides the class name of a code that renders the media type on the client's station.

The thumbnail frames 204 carry a minimalistic representation of the information shared by the HotMedia File Framework 201. For example, if the information carried in the file is a description of merchandise, the thumbnail would carry a single image. Thumbnail frames make it possible to provide the user a quick introduction to the subject with minimal code and data transfer. Since users pay attention to the detail only when the subject is of some interest, it would be wasteful for such data codes to label anything beyond the initial experience unless an interest is indicated. In addition to a frame header, the thumbnail frame also carries parameters for producing image pan and animation effects on the single image.

Meta frames 206 carry specification of non-media specific information pertaining to enablement of hyperlinked actions from media context, tracking of interaction and adaptive delivery of rich media content. Action semantics associated with media segments can be expressed in HotMedia files 200 using range 205 and action subtypes 207. Range frames 205 are made up of range records that identify and enable spatio-temporal segments of media. A spatial range can be described by a rectangular or elliptical contour. Temporal ranges can refer to a time range in milliseconds for a real-time media like audio or count range for non-real-time media like animation.

The media frames 208 contain media bit-stream data 209, initialization data 210, behavior data 215 and code 217. The behavior data and initialization data define the page and configuration of a corresponding media player, respectively. Media bit-stream data belongs to a particular media track and can be carried over multiple frames. These frames can be interlinked with Meta frames and frames belonging to other media tracks. Media frames are identified by frame type and track identifiers carried in their header 213. The frame type and track identifier enable true multiplex delivery and, hence, are ideal for static or dynamic proportioning of the earliest media tracks over limited bandwidth. Media features can also often contain codes 217 that run to the media type on the client's station.

The end of stream frame 212 is a marker that signals the end of the entire presentation associated with the HotMedia file 200. Frames belong to a multimedia track and Meta data can be multiplexed in the HotMedia file. The end of the stream is valuable to the client's station and recognizes the end of each HotMedia file data stream which, may otherwise, be impossible when stream initialization data for each stream does not require their respective lengths.

Additional details on the HotMedia File Format are described in patent application Ser. No. 09/268,537, filed Mar. 12, 1999, entitled "Framework for Progressive Hierarchical & Adaptive Delivery of Rich Media Presentations and Associated Meta Data."

In FIG. 3, a process 300 for creating searchable rich media content will now be described. The process 300 is initiated in Step 301, after which, a general description of the file, such as the source, copyright, and script, are provided by the creator and incorporated into the header frame 202 of the multimedia file 200 (See FIG. 2).

In Step 305, media data is imported into the file and the process cycles through determining whether media data is imported in Step 307; audio data is imported in step 309; animation data is imported in Step 311; panorama data is imported in Step 313; IPIX data is imported in Step 315; 3-D data is imported in Step 317; and video data is imported in Step 319. Where media data is present, Step 321 is performed to input the description for the specific media tracks in the media and Meta frames, 208 and 206, respectively, shown in FIG. 2. A security level is set for the information in Step 323, and in Step 325, the range is defined and interactive information action is specified in fields 205 and 207, respectively, in the Meta frame 206 of FIG. 2. After each import, Step 327 recycles the program to Step 305 until all media information has been imported. After which, Step 329 creates the single rich media file 200 and the process ends.

In FIG. 4, a process 400 will now be described for building a searchable rich media database. The process is started in Step 401, which initiates the import of the rich media file 200 in Step 403. The RMBE 22 (see FIG. 1) loads a rich media parser in Step 405. The general information about the rich media file is parsed in step 407. A test 409 is performed to determine whether the file includes image or panorama tracks. A "no" condition initiates Step 411, which parses the description information for the specific media track according to different security levels. A "yes" condition initiates Step 413 in which an image content-based search engine, e.g., IBM QBIC is activated to extract image or panorama track content from the file as searchable content units, after which the process returns to Step 411. Upon completion of Step 411, Step 415 is performed to determine whether there is more than one media track contained in the file 200. A "yes" condition returns the process to Step 409. A "no" condition initiates Step 417 in which the searchable content units are exported to a universal database, for example IBM DB2, after construction of a searchable database directory 40 (see FIG. 1) using well known processes.

FIG. 5 shows the system of FIG. 1 in a search and delivery mode for rich media data. A web client station 500 interacts with a web server 502, coupled to a rich media database 504 and to the output 519 of the rich media searching system 10. The client station includes a bus 501 coupling a processor 510 to a memory 511 and input/output devices including a display 516. The memory includes browser software 517. There are two options to search a query in the database 504. One option, 518, uses an off-line search process based on the searchable database directory 40. Another option 520 uses a real-time search scheme.

When the search query including a color or texture and key words, for example, "Macys's on sale," are presented to the database 504, the images using visual characteristics are closest to the examples, are presented using existing image search technologies, like IBM QBIC, and the matched key words.

Normally the off-line searching mode is used. When a searchable database directory is not constructed, real-time search process can be used to search all rich media content in real-time and obtain complete search results. However, the real-time search will take a longer time to do real-time computing.

No matter whether real-time or off-line searching modes are used, two search options are available. A regular search option deals with the thumbnail and media description content of the file 200. An advanced search option deals with the thumbnail, JPEG or GIF-based animation, Panorama or video frames and the description information.

If there is no thumbnail in the file, the description information is shown first or a key image frame will be shown in the index page presented to the display 516. The priority can be set in the content creation phase.

FIG. 6 shows multiple search results displayed in an index page 600 related to input queries including key words, and color patterns. The page including the thumbnail 601 and description text 603 will be displayed even though the related rich media contents may use a different player or viewer. Typically, the thumbnail will be displayed first.

FIG. 7 discloses an example of an index page 700 for search results based on search queries "on sale," "Macys's," and a small image pattern. Contained within the page 700 are thumbnails 701, 703, 705 and 707. Obviously the thumbnail display uses much less computer resource than regular search systems which display considerable rich media content in one page simultaneously. The thumbnail also solves the problem associated with having too many Java applets on a page as in regular search systems.

When a client clicks a thumbnail, which he/she is interested in, the rich media content is automatically played back without leaving the current index page. Dynamic HTML (DHTML) is used to swap seamlessly to the file 200 upon user interest without leaving the current index page.

One DHTML implementation uses I-FRAME, which works in most popular web browsers. The HTML code of the input page has the following style:

```
<HTML>
<BODY>
<I-FRAME NAME = "I-frame 1" SRC = "I-frame 1.HTM">
</I-FRAME>
<I-FRAME NAME = "I-frame 2" SRC = "I-frame 2.HTM">
</I-FRAME>
. . .
<I-FRAME NAME = "I-frame N" SRC = I=frame N.HTM">
</I-FRAME>
. . .
</BODY>
</HTML>
```

A separate HTML page (I-frame i. HTM, i=1, 2, . . . N) can be set for each frame. In each I-frame, the HTML page will be designed to display thumbnail first. In each HTML page, a Java script function is set to dynamically load rich media player (Java class files) upon the user's mouse click. The Java script function will automatically replace the current thumbnail with a rich media content file without interrupting any other thumbnails. Accordingly, there is no intrusion to any other search results.

FIG. 8, shows an index page 800 after the user has expressed an interest in thumbnail 707 in FIG. 7. Once the mouse is clicked on thumbnail 707, the thumbnail 707 will disappear and at the same time the HotMedia class file will be loaded and the corresponding rich media content shown in thumbnail 801 will be displayed in place of thumbnail 707.

While the invention has been shown and described in a preferred embodiment, various changes can be made without departing from the spirit and scope of the invention as defined in the appended claims.

We claim:

1. A method of creating and searching a searchable multimedia database, the method comprising the steps of:
    obtaining a previously-authored rich media file, the previously-authored file comprising one or more forms of media-based content and descriptive information;
    extracting individual forms of the media-based content and the descriptive information from the previously-authored file respectively utilizing one or more content-based extractors and a descriptive information-based extractor, wherein a particular content-based extractor is operative to extract searchable content units associated with a particular content type and the descriptive information-based extractor is operative to extract descriptive information relating to non-searchable content; and
    processing the searchable content units and the descriptive information relating to the non-searchable content respectively utilizing a content-based search engine and a text search engine so as to generate a searchable multimedia database directory;
    wherein the one or more content-based extractors, the descriptive information-based extractor the content-based search engine and the text search engine are useable in a real-time search of a corresponding multimedia database in response to an input query and the searchable multimedia database directory is useable in an off-line search of the corresponding multimedia database in response to an input query.

2. The method of claim 1, wherein the previously-authored file is a HotMedia file.

3. The method of claim 2, wherein the Hotmedia file comprises one or more thumbnail images representative of the file content.

4. The method of claim 1, wherein the one or more content-based extractors and the descriptive information-based extractor are one or pluggable and modularized.

5. The method of claim 1, further comprising the step of displaying a search result in a HyperText Markup Language (HTML) page.

6. The method of claim 5, further comprising the step of swapping between the HTML page and the previously-authored file upon selection of information displayed in accordance with the HTML page.

7. The method of claim 5, wherein the displaying step further comprises displaying one or more thumbnail images in accordance with the HTML page.

8. The method of claim 7, further comprising the step of replacing a selected thumbnail image with media content without altering the remainder of the HTML page.

9. The method of claim 1, wherein the searchable multimedia database is useable in accordance with an electronic commerce application executable over a distributed network.

10. The method of claim 1, wherein the individual forms of the media-based content comprise at least one of images, panoramas, audio and video.

11. Apparatus for creating and searching a searchable multimedia database, the apparatus comprising:
    a memory; and
    at least one processor coupled to the memory and operative to: (i) obtain a previously-authored rich media file, the previously-authored file comprising one or more forms of media-based content and descriptive information; (ii) extract individual forms of the media-based content and the descriptive information from the previously-authored file respectively utilizing one or more content-based extractors and a descriptive information-based extractor, wherein a particular content-based extractor is operative to extract searchable content units associated with a particular content type and the descriptive information-based extractor is operative to extract descriptive information relating to non-searchable content; and (iii) process the searchable content units and the descriptive information relating to the non-searchable content respectively utilizing a content-based search engine and a text search engine so as to generate a multimedia database directory, wherein the one or more content-based extractors the descriptive information-based extractor, the content-based search engine and the text search engine are useable in a real-time search of a corresponding multimedia database in response to an input query and the searchable multimedia database directory is useable in an off-line search of the corresponding multimedia database in response to an input query.

12. The apparatus of claim 11, wherein the previously-authored file is a HotMedia file.

13. The apparatus of claim 12, wherein the Hotmedia file comprises one or more thumbnail images representative of the file content.

14. The apparatus of claim 11, wherein the one or more content-based extractors and the descriptive information-based extractor are one or pluggable and modularized.

15. The apparatus of claim 11, wherein the processor is further operative to cause the display of a search result in a HyperText Markup Language (HTML) page.

16. The apparatus of claim 15, wherein the processor is further operative to cause a swapping between the HTML page and the previously-authored file upon selection of information displayed in accordance with the HTML page.

17. The apparatus of claim 15, wherein the displaying operation further comprises displaying one or more thumbnail images in accordance with the HTML page.

18. The apparatus of claim 17, wherein the processor is further operative to cause the replacement of a selected thumbnail image with media content without altering the remainder of the HTML page.

19. The apparatus of claim 11, wherein the searchable multimedia database is useable in accordance with an electronic commerce application executable over a distributed network.

20. The apparatus of claim 11, wherein the individual forms of the media-based content comprise at least one of images, panoramas, audio and video.

21. A system for creating and searching a searchable multimedia database, the system comprising:
    an authoring system; and
    a media database engine coupled to the authoring system and operative to: (i) obtain a previously-authored rich media file, the previously-authored file comprising one or more forms of media-based content and descriptive information; (ii) extract individual forms of the media-based content and the descriptive information from the previously-authored file respectively utilizing one or more content-based extractors and a descriptive information-based extractor, wherein a particular content-based extractor is operative to extract searchable content units associated with a particular content type and the descriptive information-based extractor is operative to extract descriptive information relating to non-searchable content; and (iii) process the searchable content units and the descriptive information relating to the non-searchable content respectively utilizing a content-based search engine and a text search engine so as to generate a multimedia database directory, wherein the one or more content-based extractors, the descriptive information-based extractor the content-based search engine and the text search engine are useable in a real-time search of a corresponding multimedia database in response to an input query and the searchable multimedia database directory is useable in an off-line search of the corresponding multimedia database in response to an input query.

22. The system of claim 21, wherein the media database engine is further operative to return a result of an input query to a user.

* * * * *